United States Patent
Inohara et al.

(10) Patent No.: US 6,256,747 B1
(45) Date of Patent: Jul. 3, 2001

(54) METHOD OF MANAGING DISTRIBUTED SERVERS AND DISTRIBUTED INFORMATION PROCESSING SYSTEM USING THE METHOD

(75) Inventors: Shigekazu Inohara, Kokubunji; Yoshimasa Masuoka, Kodaira; Jinghua Min, Kodaira; Fumio Noda, Kodaira, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/159,784

(22) Filed: Sep. 24, 1998

(30) Foreign Application Priority Data

Sep. 25, 1997 (JP) .................................. 9-259591

(51) Int. Cl.⁷ .................................................. G06F 11/00
(52) U.S. Cl. ................................................ 714/4; 709/201
(58) Field of Search ................................. 714/4, 15, 16, 714/25, 27, 38, 39, 42, 43; 709/201, 203, 207, 205, 220, 221, 229, 249

(56) References Cited

U.S. PATENT DOCUMENTS

| | | | |
|---|---|---|---|
| 4,887,204 | * 12/1989 | Johnson et al. | 364/200 |
| 5,572,724 | * 11/1996 | Watanabe et al. | 395/616 |
| 5,619,656 | * 4/1997 | Graf | 395/200.11 |
| 6,061,722 | * 5/2000 | Lipa et al. | 709/224 |
| 6,141,686 | * 10/2000 | Jackowski et al. | 709/224 |

OTHER PUBLICATIONS

Menges, et al., Method and apparatus for managing computer processes, EPAB, Pub. No. EP000737922A1, 1–1, Oct. 1996.*

Ando et al., Terminal identification number imparting method and server device, JPAB, Pub. No. JP410271117A, Oct. 1998.*

Matsushita Denki Sangyo, Video disk recorder configured with random access device in a video server, Derwent week, Oct. 1996.*

* cited by examiner

*Primary Examiner*—Nadeem Iqbal
(74) *Attorney, Agent, or Firm*—Antonelli, Terry, Stout & Kraus, LLP

(57) ABSTRACT

In order to effectively make the grasp of operating conditions of a plurality of servers and a cache management in an information system without increasing a time/labor taken by an administrator, the plurality of servers forms a multi-cast hierarchy dynamically reconstructed by virtue of mutual support and the communication of server status, cache directory and validation is performed on the hierarchy. The administrator has not a need of management for cooperation between servers excepting the designation of some other servers for startup thereof. A cache between servers is shared through the exchange of a cache directory and a validation time is reduced, thereby shortening the response time for users.

34 Claims, 9 Drawing Sheets

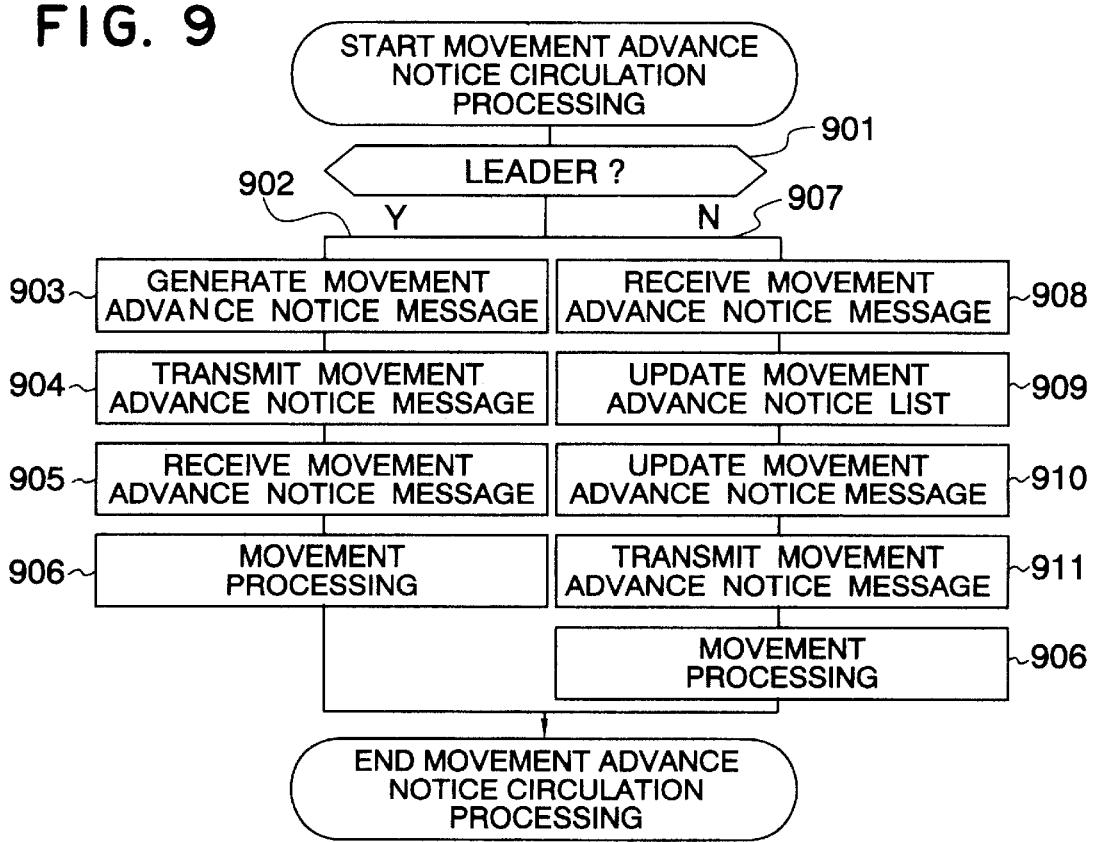
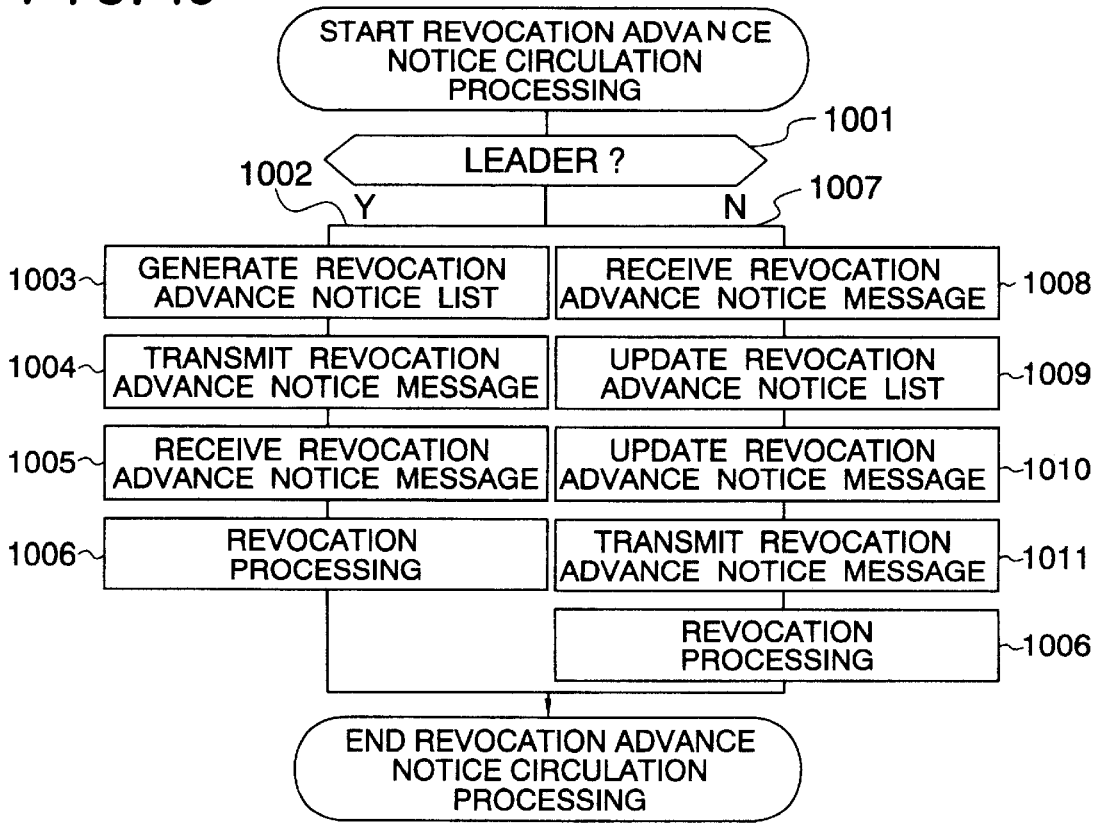

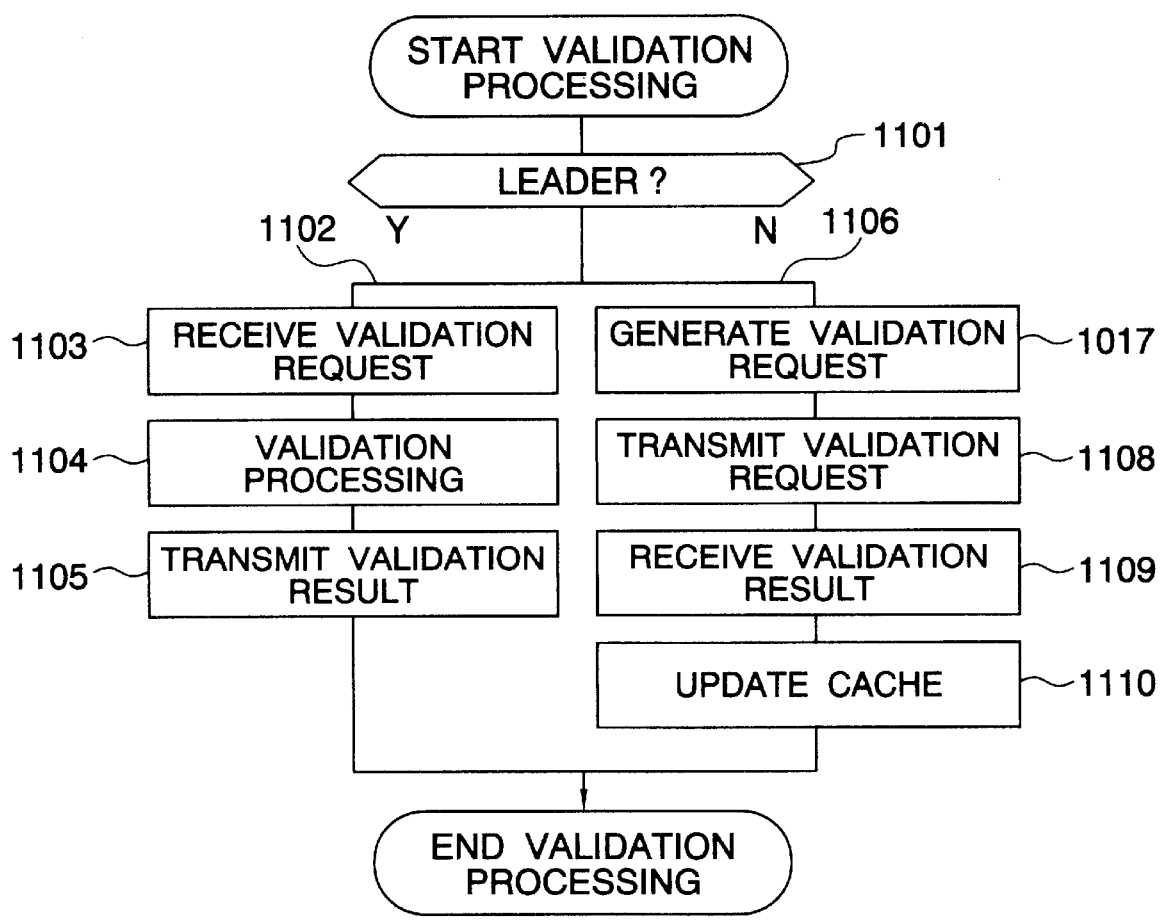

METHOD OF MANAGING DISTRIBUTED SERVERS AND DISTRIBUTED INFORMATION PROCESSING SYSTEM USING THE METHOD

BACKGROUND OF THE INVENTION

The present invention relates to a computer processing system, particularly to a system managing method in structuring a system in which a plurality of computers connected by a network distribute, share and change information (or an information processing system), and more particularly to a distributed server managing method which is suitable for world-wide web (WWW) and a distributed information processing system which uses such a method.

The existing information system is operated in such a manner that a plurality of computers connected to a network provide or acquire information. Hardware and software of a computer for mainly providing information are called a server, and hardware and software of a computer for mainly acquiring information are called a client.

In the conventionally used information processing system, in the case where there are a plurality of servers, the servers are not in cooperation with each other at all (for example, even if there are first and second servers, any one of these servers does not know the existence of the other or does not depend on the other) or are in strong cooperation with each other (for example, first and second servers exchange or cache data).

In the case where during the operation of a first server a second server is newly established or started (generically called the addition of server) or in the case where the second server is temporarily stopped or has a trouble inclusive of both the trouble of the server itself and the trouble of a communication line to the server (generically called the deletion of server), the conventional requirement for cooperation of the first and second servers with each other is the proper setting of the first and second servers by an administrator (or administrative operator).

In the case where the number of servers is very small, the above requirement offers no special problem. However, in the case where the number of servers becomes large, a large load is imposed on the administrator when a server is to be newly added or to be deleted.

With the explosive growth of the Internet and the WWW in recent years, there has been generated the situation in which the number of servers is very large. Techniques used in the WWW will first be described.

In the WWW, a WWW server holds information in units called "home pages". Each home page has a name called URL (which is the abbreviation of Uniform Resource Locator). When the URL of a home page to be accessed is designated to a WWW client by the user of the WWW client, a first processing configuration in the WWW includes requesting a WWW server designated by the corresponding URL for the transmission of a home page corresponding to the URL. In response to this request, the designated WWW server provides the corresponding home page to the WWW client.

In a second processing configuration, the WWW client does not request the WWW server designated by the URL given by the user and thereinstead requests another kind of server called "proxy server" (or simply called "proxy"). The proxy acquires a home page corresponding to the URL from the WWW server or transfers the URL to another proxy. In the case where the request to proxy includes a plurality of steps, the proxies have a parent-child relationship. The proxies having the parent-child relationship have been disclosed by, for example, A. Chankhunthod et al, "A Hierarchical Internet Object Cache", 1996 USENIX Technical Conference, pp. 153 to 163, 1996 (hereinafter referred to as Reference 1). The WWW proxy can have a cache shared between a plurality of clients. In the recent Internet, therefore, the second processing configuration embracing many proxies is widely used. Which of the proxies does each proxy transfer the request to is set by an administrator.

Some information processing systems as well as the WWW are widely used. In any system, however, the cooperation of a plurality of servers with each other is limited to a fixed relationship set by an administrator.

A network news system disclosed by, for example, B. Kantor et al, "Network News Transfer Protocol: A Proposed Standard for the Stream-Based Transmission of News", Network Working Group RFC-977 (hereinafter referred to as Reference 2) is another example of the information system and is constructed by a plurality of servers in a manner similar to that in the WWW.

The copies of "news articles" which clients subscribe for and contribute are distributed by the plurality of servers in the network news system to each other. The administrator of each server sets another server for which the transfer of news articles is to be made. In the case where a new server is added, it is necessary to manually change the setting of the existing servers.

Further, DNS domain name service disclosed by, for example, P. Mockapetris, "Domain Names-Implementation and Specification", Network Working Group RFC-1035, especially the Second Chapter (hereinafter referred to as Reference 3) is a further example of the information system and is constructed by a plurality of servers.

The DNS makes a host name of the Internet and accompanying information of that host name (IP address and mail server) correspond to each other. In order to hold this corresponding information, a plurality of DNS servers form a tree structure. A request from a client is processed in such a manner that it is transferred between the plurality of servers with the trace of the tree structure.

The administrator of each DNS server sets which another DNS server is a request to be transferred to. In the case where a certain DNS server is replaced, the setting of DNS servers adjacent thereto requires to be manually changed. Also, each node of the above-mentioned tree structure takes a redundant construction including two or more DNS servers. In the case where those DNS servers have troubles (or in the case where network paths to those DNS servers have troubles), it is also necessary to manually change the setting of adjacent DNS servers.

Also, in a distributed file system of a local area network (LAN), there is known a method called "cooperative caching" in which a space for caches is shared by a plurality of computers. For example, in Michael Dahlin et al, "Cooperative Caching: Using Remote Client Memory to Improve-File System Performance", First USENIX Symposium on Operating Systems Design and Implementation, pp. 267–280, 1994 (hereinafter referred to as Reference 4), a server called "manager" holds information of which file server is which file block stored in. When the manager is requested by a client for the transfer of a file block, the manager responds to the client about a computer in which that file block is stored or the manager transfers the client's request to the corresponding file server. Though there can exist a plurality of managers, the correspondence between the managers and file blocks is set beforehand. In order to change this correspondence, it is necessary for an administrator to manually change the setting.

In the WWW, rapid growth is being continued. For example, certain statistics showed the increase of 2.8 times in the number of servers in a half-year period from June of 1996 to January of 1997. Therefore, the whole of WWW has an explosively increasing amount of information. Though the proxy acts as a cache shared by a plurality of clients to reduce the response time for users (or a time from the issuance of a request by a user for information to the arrival of that information at the user's hand), an effect obtained in the existing circumstances is low since the capacity of the cache is small as compared with the amount of information in the whole of WWW.

A first problem to be solved by the present invention is to reduce a time/labor taken by an administrator when a plurality of servers are caused to cooperate with each other as in the WWW proxies. Thus, there is solved the problem that a long time and a large number of persons are required for management in realizing a large-scale cache embracing many proxies. Particularly, the first problem is such that in the case where a first server is to be added or deleted, existing second servers are informed of the existence (or non-existence) of the first server without the setting of the existing second servers by the administrator and the first server is informed of the existence (or non-existence) of the second servers.

Since the WWW operates on the Internet with an enormous number of machines connected and with a multiplicity of management organizations, a method using broadcast or a method using the centralization of all settings upon a single server is not practical for the solution of the first problem. Also, in the case where the number of second servers becomes large, even the cooperation of the first server with all the second servers becomes unpractical. Thus, in the case where the number of servers becomes very large, a contrivance for limiting the number of servers to be subjected to cooperation is required.

In the case where the first problem is solved, there is required a method in which in order to operate caches existing distributed to a plurality of servers, these servers effectively exchange their cache lists therebetween so that information absent in the cache of one server is inquired of another server. The realization of this method is a second problem to be solved by the present invention.

The solution of the first and second problems will result in the realization of a large-scale cache which extends over a plurality of servers. However, it has been found out that though the communication protocol HTTP used in the WWW requires an operation of confirming whether or not a cache is holding sufficiently fresh information (hereinafter referred to as validation operation), this validation operation deteriorates the response time for users. Therefore, a third problem to be solved by the present invention is to prevent the validation operation from deteriorating the response time for users.

BRIEF SUMMARY OF THE INVENTION

An object of the present invention is to provide a distributed server managing method for solving the above first to third problems and a distributed information processing system using the method.

(1) In order to solve the first problem, a "server status propagation protocol" for distributed management of server operation information (or a list of operating servers) is provided. Each server starts from the names of a small number of other servers given from an administrator to dynamically structure a multi-cast hierarchy of server operation information by virtue of the mutual support of server groups. The multi-cast hierarchy includes groups of a tree structure formed by server groups. Each group is composed of several to several-tens servers. As a part of servers are stopped or restarted, the dynamic reconstruction of the multi-cast hierarchy is made.

In the present invention, it is only required that at the time of start of a certain server, the names of some other servers are given. Thereafter, the administrator is not required to change the setting of each server each time a part of plural servers are stopped or restarted. The server status propagation protocol of the present invention is fit for use on the Internet since broadcast is not required and multi-cast is made for only server groups under operation. When each server makes the exchange of server operation information, the communication is performed taking preference of proximate servers. Thereby, the system is operable even in the case where the number of servers becomes very large. Namely or thereby, the first problem is solved.

(2) In order to solve the second problem, a "wide-area cooperative cache management protocol" is provided. This protocol performs the propagation of a cache directory (a list of URL's and servers which hold the URL's in caches) using the multi-cast hierarchy formed by the above-mentioned server status propagation protocol and a cache control (which URL does which server hold in a cache, and when is which URL to be transferred from a certain server to another server) without needing a centrally managing server corresponding to the manager in Reference 4.

There is a case where a server moves certain information to another server. In this case, it is necessary to determine a server which is the destination of movement. For this purpose, a server circulates the minimum value for its own acceptable cache value (hereinafter referred to as acceptable cache value) through other servers. Also, in the case where a plurality of servers in one group are simultaneously intending to move information, there may be a possibility that the destination of movement is centralized onto one server. In order to solve this problem, each server circulates a list of information to be moved and intended destinations of movement. Thereby, each server can determine a server for destination of movement while avoiding the destination of movement which is not selected by another server. Further, in the case where a plurality of proximate servers hold a cache of the same information, it is necessary to manage so that all the copies of this cache are not revoked simultaneously. In order to make the approach to this state through an approximate method without using a central server, a list of information to be revoked (referred to as revocation slate) is circulated through servers. A member of a group gives up an intended revocation in the case where the cache of information the revocation of which is intended by the member himself or herself is the last copy held by members of the group. With the above, the second problem is solved.

(3) In order to solve the third problem, "anticipatory validation" is provided in which a validation operation is performed not at a point of time of request by a user for information but beforehand prior to the request from the user. The anticipatory validation is performed, for example, every fixed time or after the lapse of a fixed time from the reference to URL. This anticipatory validation is performed within a time zone allowed by the HTTP protocol. Thereby, a time consumed for validation operation and having hitherto occupied a considerable part of the response time for users can be removed from the response time for users. Thus, the third problem is solved.

BRIEF DESCRIPTION OF THE DRAWINGS

FIG. 9 is a flow chart of a movement advance notice circulation processing;

FIG. 10 is a flow chart of a revocation advance notice circulation processing; and FIG. 11 is a flow chart of a validation processing.

DETAILED DESCRIPTION OF THE INVENTION

Figure 1:
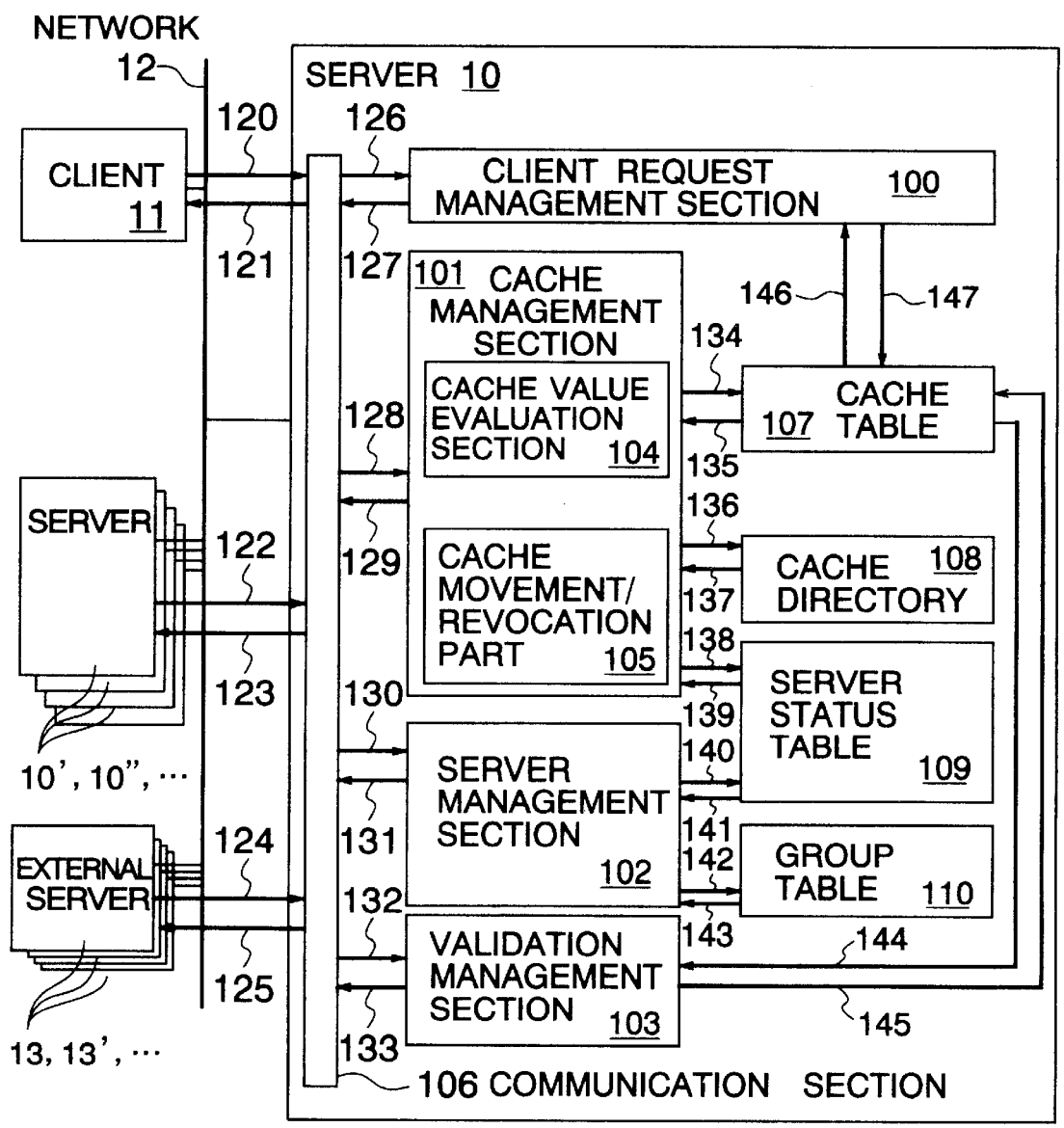
FIG. 1 is a block diagram showing the internal construction of the present invention.
Figure 2:
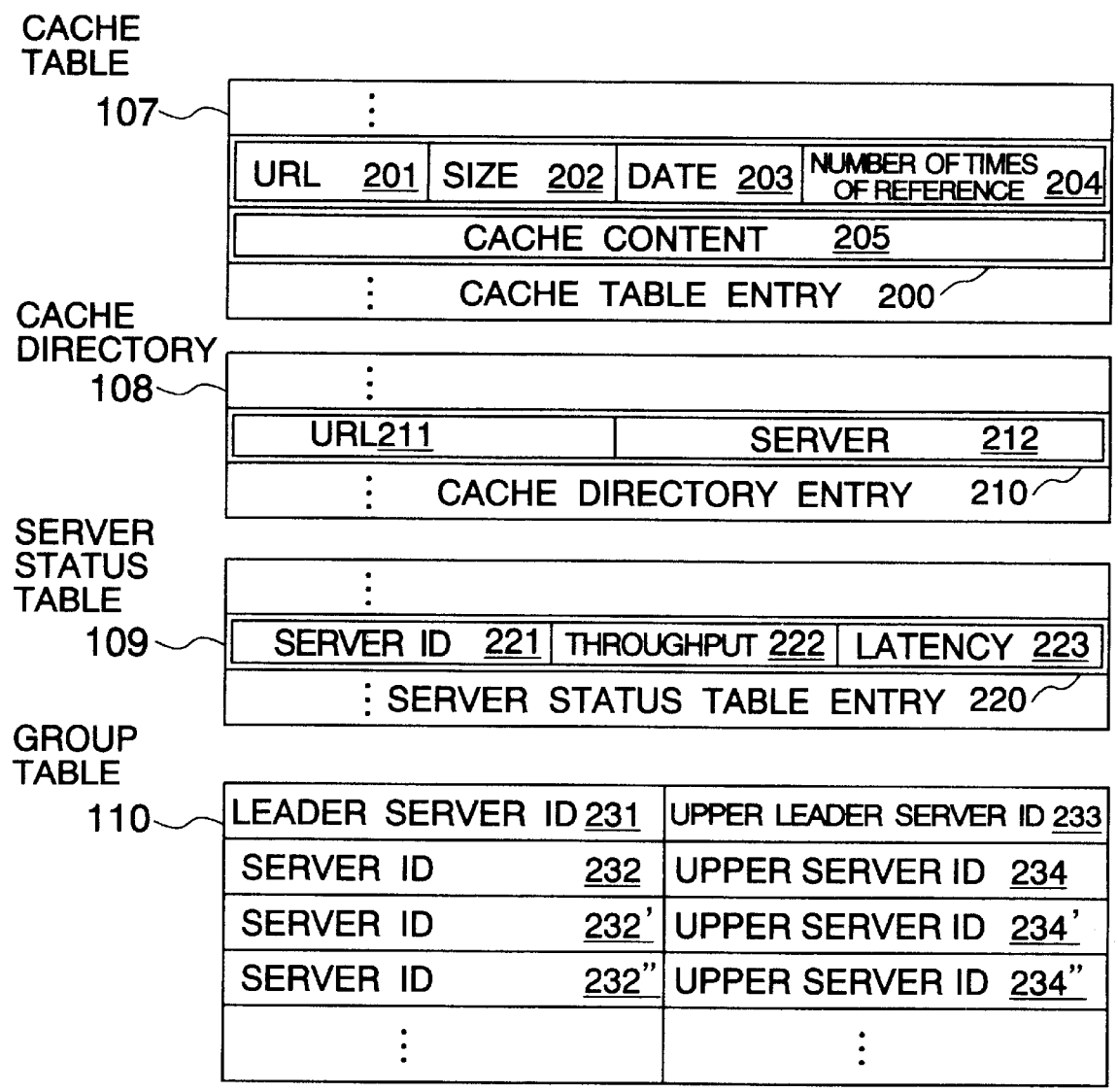
FIG. 2 is diagrams showing data structures.

The construction of an embodiment will be described using FIGS. 1 and 2.

An external server 13, 13', 13", . . . is a computer which holds information provided by an information system and provides the information to a client 11 or a server 10, 10', 10", . . . in accordance with a request. The server 10, 10', 10", . . . is a server which holds a cache of the information system. The client 11 is a computer which is utilized by a user and with which information provided through a network 12 from the external server 13, 13', 13", . . . or the server 10, 10', 10", . . . is displayed for the user. The server 10, 10', 10", . . . holds as a cache that information in the external servers 13, 13', 13", . . . which has recently been utilized by the client 11 and that information in the external servers 13, 13', 13", . . . for which the utilization by the client 11 in the future is expected. Though several purposes may be considered for this cache, a typical purpose is to shorten a time which the client 11 takes for acquiring information. With the construction in which the client 11 makes access to the server 10, 10', 10", . . . in place of the external server 13, 13', 13", . . . , it is possible for the client 11 to make access to information at a high speed even in the case where the external server 13, 13', 13", . . . is far distant on the network 12.

The computer in this embodiment may be any computer which includes a so-called personal computer, a work station, a parallel computer, a large size computer, and so forth. The client 11 may be various computer terminal equipments, portable communication terminals (so-called personal digital assistance PDA and hand-held personal computer HPC), network computers and so forth, so far as it has a function of communicating with the servers 10, 10', 10", . . . and displaying information.

The external server 13, 13', 13", . . . , the client 11 or the server 10, 10', 10", . . . may be realized by not a computer but the combination of a computer and software. In particular, the present invention may be embodied without applying any change to a computer itself but by a program (or process) which operates on the computer.

The network 12 may be LAN which is well used by the whole or one department of a certain body (enterprise, school or similar body) or a part or the whole of WAN which couples a plurality of geographically distributed locations. Also, the network 12 may be a coupling network between computers or a coupling network between processor elements in a parallel computer.

The server 10 has processing sections which include a client request processing section 100, a cache management section 101, a server management section 102 and a communication section 106. The server 10 further has data structures which include a cache table 107, a cache directory 108, a server status table 109 and a group table 110. The cache management section 101 includes processing parts composed of a cache value evaluation part 104 and a cache movement/revocation part 105. The servers 10, 10', 10", . . . have their server ID's (or simply ID's) which are respective unique numbers. As the server ID is used an ID which is capable of making the server ID correspond to a communication address of the server to perform communication. For example, an IP address may be used as the server ID.

The client request processing section 100 is a section which is responsive when the client 11 makes a request for the acquisition of information. A message from the client request processing section 100 is sent to the network 12 through the communication section 106 (127). Reversely, a message from the network 12 to the client request processing section 100 is sent through the communication section 106 to the client request processing section 100 (126). The client request processing section 100 performs the reading (146) for the cache table 107. On rare occasions, the client request processing section 100 performs the writing (147) for the cache table 107.

The cache management section 101 is a section for managing a cache which the server 10 holds. The cache management section 101 performs the reception and transmission (128 and 129) of a message for the network 12 through the communication section 106. Also, the cache management section 101 performs the writing and reading (134 and 135) for the cache table 107, the writing and reading (136 and 137) for the cache directory 108 and the writing and reading (138 and 139) for the server status table 109. The cache value evaluation part 104 in the cache management section 101 is a part which judges how useful is the holding of specified information. Also, the cache movement/revocation part 105 in the cache management section 101 is a part by which, in the case where a cache of certain information is not to be placed in the server 10, the cache is revoked or the cache is moved to one or more other servers 10', 10", . . .

The server management section 102 is a section for making up a list of the other servers 10', 10", . . . to manage the operating conditions of these servers. The server management section 102 performs the reception and transmission (130 and 131) of a message for the network 12 through the communication section 106. Also, the server management section 102 performs the writing and reading (140 and 141) for the server status table 109 and the writing (142) and reading (143) for the group table 110.

A validation management section 103 is a section for making a control of anticipatory validation. The validation management section 103 performs the reception and transmission (132 and 133) of a massage for the network 12 through the communication section 106. The validation management section 103 performs the writing and reading (144 and 145) for the cache table 107.

The communication section 106 is a section for communicating with the client 11, the other servers 10', 10", . . . and the external servers 13, 13', 13", . . . . The reception and transmission for the client 11 are performed by 120 and 121. The reception and transmission for the other servers 10', 10", . . . are performed by 122 and 123. The reception and transmission for the external servers 13, 13', 13", . . . are performed by 124 and 125.

The cache table 107 is a table which holds the substance of a cache of the server 10 and various attributes of the cache. The cache table 107 includes one or more cache table entries 200. One cache table entry 200 corresponds to one cache of one information. URL 201 holds the URL of the corresponding information. Size 202 holds the number of bytes of the corresponding information. Date 203 holds the latest update date of the corresponding information. The number of times of reference 204 holds the number of times of reference to the corresponding information in the recent. Cache content 205 holds the copy of the corresponding information.

The cache directory 108 is a table which holds information of which of the servers 10, 10', 10", . . . possesses the cache of which information. The cache directory 108 includes one or more cache directory entries 210. One cache directory entry 210 corresponds to one information possessed by one other server. URL 211 holds URL of the corresponding information, and server ID 212 holds the server ID of the corresponding server.

The server status table 109 is a table which holds the ID's of some of the servers 10, 10', 10", . . . and the attributes such as operating conditions thereof. The server status table 109 includes one or more server status table entries 220. One server status table 109 corresponds to one server. Server ID 221 holds a server ID of the corresponding server. Throughput 222 holds the throughput (bit/sec) of a communication line leading to the corresponding server, and latency 223 holds the latency (sec) of the communication line leading to the corresponding server. If the server status table 109 has no entry for a certain server or the throughput 222 is 0 or the latency 223 is "infinity", it is meant that the corresponding server is not under operation or a trouble is generated in a communication line leading to the corresponding server.

The group table 110 is a table which holds some proximate server groups selected from a group of servers stored in the server status table 109. One group includes MAX servers or members (MAX: a fixed number) at the largest. A group of servers in each group are sequenced in that group in accordance with their server ID's. A server in the group having the smallest server ID is called "leader". The leader can be a member of an upper group or a group which is upper by one than the group to which the leader belongs. In performing multi-cast communication between the groups, the leader acts as a relay for that communication. If a trouble is generated in the leader, a server having the smallest but one server ID turns into a vicarious leader. In order to realize this structure, the group table 110 includes leader server ID 231 for holding the server ID of the leader, server ID's 232, 232', . . . for holding the server ID's of members, upper leader server ID 233 for holding a leader of an upper group, and server ID's 234, 234', . . . for holding the server ID's of members in the upper group.

Figure 3:
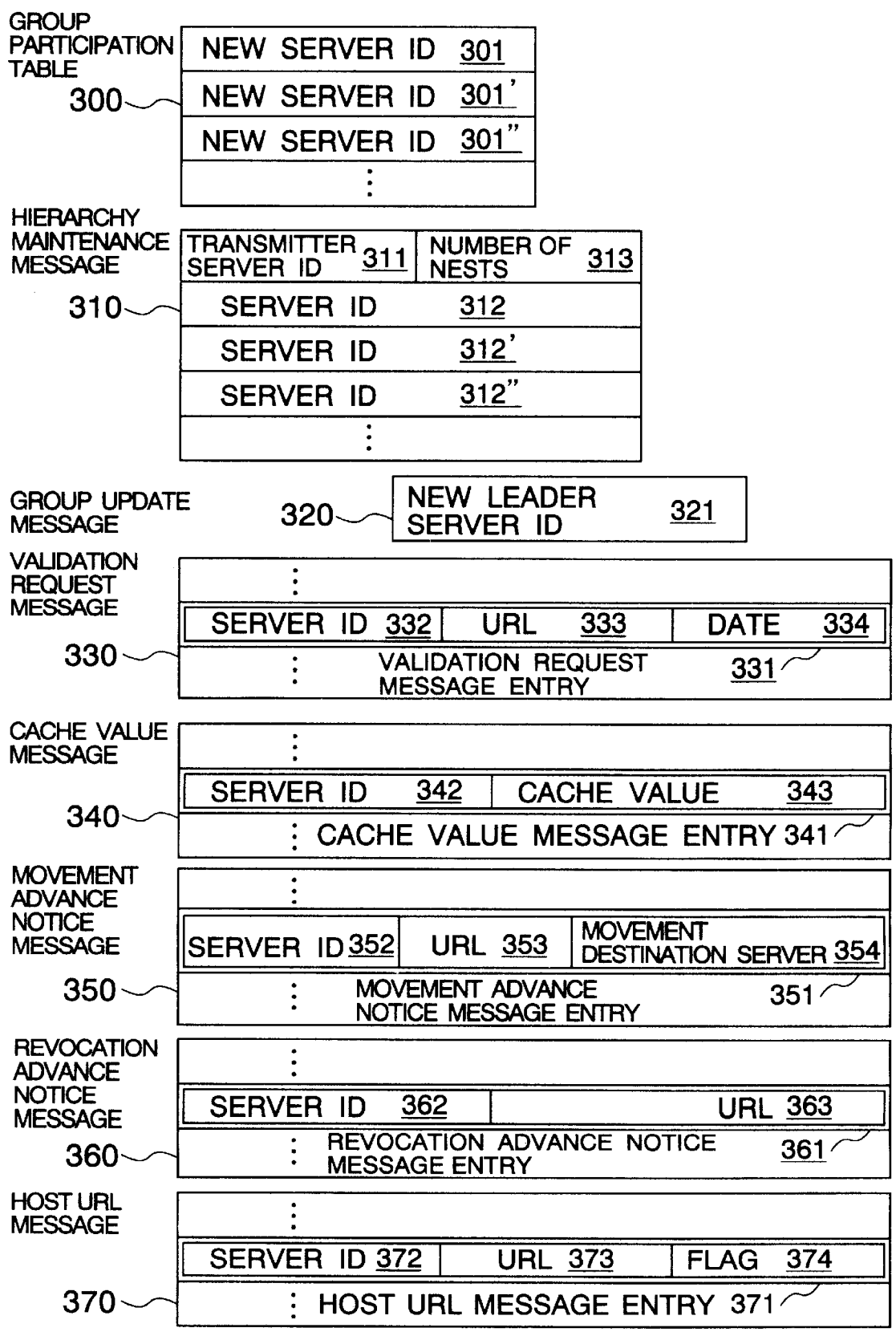
FIG. 3 is diagrams for explaining the formats of messages.

Next, the types and formats of messages used at the time of communication of the servers 10, 10', 10", . . . with each other will be described using FIG. 3.

A group participation message 300 is a message issued by a server which wants to newly participate in a group. This message is used for both the case where one server wants to participate in the group and the case where a plurality of servers want to participate in (or change) the group. The group participation message 300 has new server ID's 301, 301', . . . stored therein. They are the ID's of servers which want to newly participate in the group.

A hierarchy maintenance message 310 is a message used for confirming the operating conditions of members of a group. Usually, this message is transmitted from a leader of a certain group and is circulated through members under operation in this group and some other groups. The message returns to the leader again. The hierarchy maintenance message 310 is composed of transmitter server ID 311 or the ID of a server which first transmits this message, new server ID's 312, 312', . . . which are the ID's of servers under operation, and the number of nests 313. The number of nests 313 is used when one hierarchy maintenance message 310 is circulated over a plurality of groups. The number of nests 313 designates which level number of group should the hierarchy maintenance message 310 be circulated up/down to.

A group update message 320 is a message sent (in a usual case, from a leader) to a server permitted to participate in a group. The group update message 320 is stored with new leader server ID 321 which is the ID of a leader of the group for which the participation is to be made.

A validation request message 330 is a message which, when anticipatory validation is made, a server requesting for the anticipatory validation transmits to a server requested for the anticipatory validation. The message 330 has one or more URL's made the objects of preceding validation. The validation request message 330 includes one or more validation request message entries 331. Each entry is stored with server ID 332 which is the ID of the requesting server, URL 333 which is a URL made the object of anticipatory validation, and date 334 which is the latest updating date of the URL known by the requesting server.

A cache value message 340 is a message which is used in order that servers exchange barometers for the cache values of their whole caches with each other. The cache value message 340 includes one or more cache value message entries 341. Each entry has server ID 342 which designates a server and cache value 343 which is a barometer for the cache value of that server.

A movement advance notice message 350 is used when a first server informs a plurality of other servers that one or more information in a cache (generally, having a low cache value) is expected to be moved to a second server. The movement advance notice message 350 includes one or more movement advance notice message entries 351. The movement advance notice message entry 351 is stored with server ID 352 which is the ID of the first server, URL 353 which is the URL of the corresponding information, and movement destination server ID 354 which is the ID of the second server.

A revocation advance notice message 360 is used when a first server informs a plurality of other servers that one or more information in a cache (generally, having a low cache value) is expected to be revoked. The revocation advance notice message 360 includes one or more revocation advance notice message entries 361. Each entry is stored with server ID 362 which is the ID of the first server and URL 353 which is the URL of the corresponding information.

A host URL message 370 is a message which is used in order that servers communicates with each other as to what information is stored in its own cache. The host URL message 370 includes one or more host URL message entries 371. Each entry is stored with server ID 372 which is the ID of a server having a cache, URL 373 which is the URL of one information, and flag 374 which indicates whether or not there is the corresponding URL.

SERVER STATUS PROPAGATION

A distributed information system managing method according to the present invention is provided with a "server status propagation protocol" for distributed management of server operation information (or a list of operating servers). The operation of this protocol will now be described.

(1) Hierarchy Formation Processing

Figure 4:
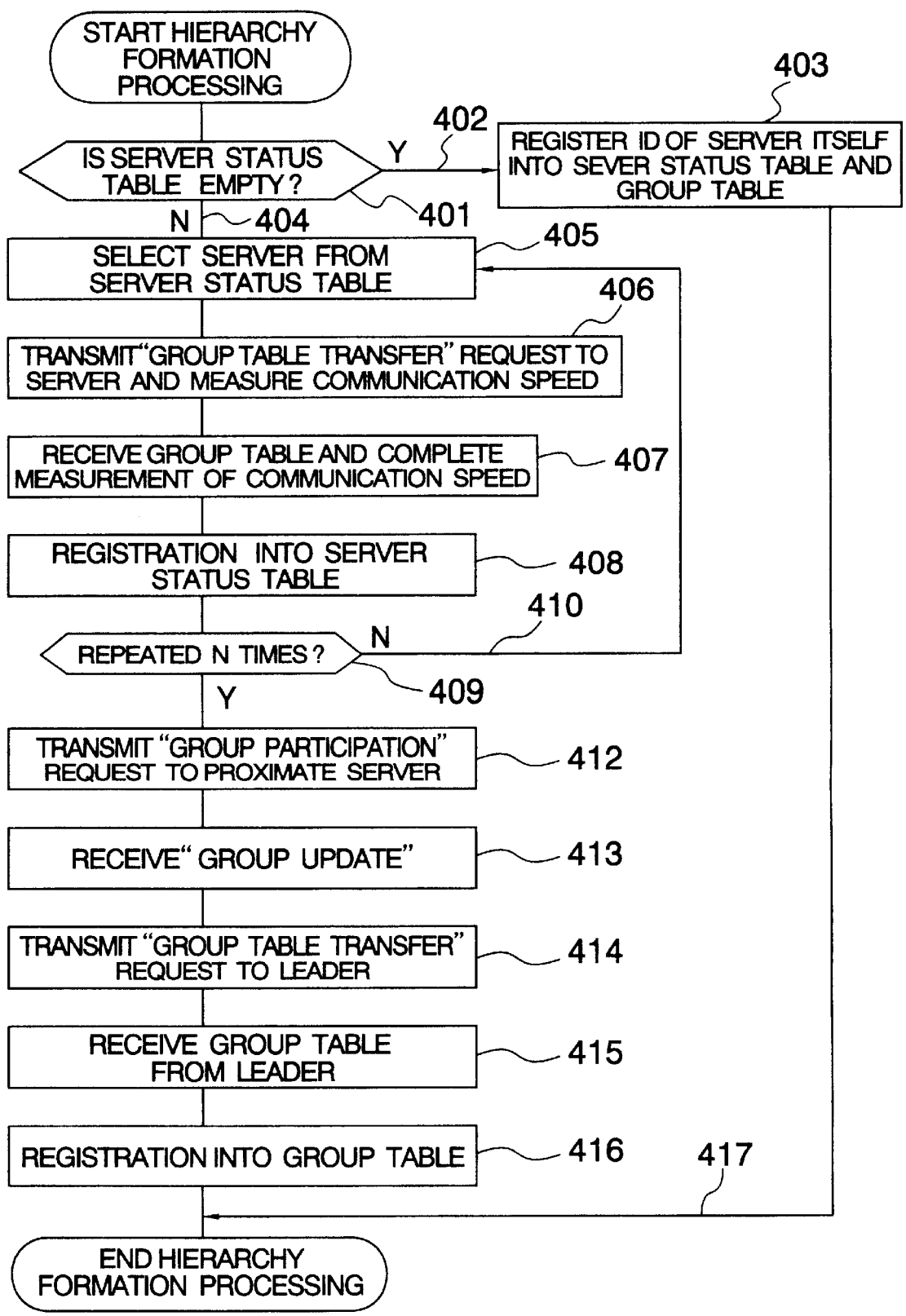
FIG. 4 is a flow chart of a hierarchy formation processing at the time of server initialization.

First, a hierarchy formation processing performed mainly at the time of server initialization will be described using FIG. 4. For simplification, the following description of a procedure for hierarchy formation processing will be made laying stress on the essential part of the operation. Namely, the description of an error processing, a timing-dependent operation and so forth will be omitted.

An administrator gives a server 10 the server ID's of zero or one or more other servers to start the server 10. When the server 10 is started, all tables are initialized into "idle" and the control is thereafter transferred to the-server management section 102. The given server ID is stored into a server status table 109. Then, there is performed an operation of examining the operating conditions of other servers 10', 10", . . . to acquire the other servers 10', 10", . . . as much as possible so that they participate in one group.

In step 401, the judgement is made of whether or not the server status table 109 is empty. If the result of judgement is Y (the abbreviation of YES) (402), the other servers are not known at all. In step 403, therefore, a new server status table entry 220 is added into the server status table 109 so that the ID of server 10 itself, "infinity" and "0" are stored into the server ID 221, throughput 222 and latency 223 of the added entry, respectively. Thereby, the hierarchy formation processing is completed (417).

On the other hand, if the result of judgement is N (the abbreviation of NO) (404), one first server is selected from the server status table 109 (step 405) and a message requesting for "group table transfer" is transmitted to the first server (step 406). At the same time or in step 406, the measurement of the speed of communication of the first server and the server 10 with each other is started. When the first server receives the "group table transfer" request message, a message having a group table 110 of the first server packed therein is sent as a response from the first server to the server 10. In subsequent step 407, the group table sent as the response from the first server is received. At the same time, the measurement of communication speed is completed.

In step 408, the measured communication speed is reflected into the server status stable 109 while the received group table of the first server is reflected into the server status table 109 of the server 10 itself. More particularly, a search for one of the server status table entries 220 having server ID 221 equal to the ID of the first server is made and the throughput 222 and latency 223 of the corresponding entry are updated using the measured communication speed. Though there may be considered many updating methods inclusive of averaging, replacement and so forth, the method based on replacement is employed in the present embodiment. Next, a new server status table entry 220 is added for each of those ID's of leader server ID, server ID's, upper leader server ID and upper server ID's included in the received group table of the first server which are of servers having no server status table entry 220 corresponding to the server status table 109. The ID of that server, "0" and "infinity" are stored into the server ID 221, throughput 222 and latency 223 of the added entry, respectively. Thereby, some servers proximate to the first server are added into the server status table 109.

In step 409, the judgement is made of whether or not the procedure including the above steps 405 to 408 has been repeated N times (N: a fixed number). If the judgement is N (410), the flow returns to step 405. If the result of judgement is Y (411), the flow goes to step 412. In step 412, a group participation message 300 is transmitted to the most proximate server in a group of servers stored in the server status table (for example, a server having the maximum value as the value of division of throughput 222 by latency 223). At this time, the server ID of the server 10 itself is stored into new server ID 301. When a group update message 320 as a response to the group participation message is received (step 413), a massage requesting for "group table transfer" is transmitted toward a leader corresponding to new leader server ID 321 of the group update message 320 (step 414). When the leader receives the "group table transfer" request message, a message having a group table 110 of the leader packed therein is transmitted as a response from the leader to the server 10. In subsequent step 407, the group table transmitted as the response from the first server is received. In step 416, the received group table is reflected into the group table 110 of the server 10 itself.

The above is the procedure for hierarchy formation processing. There may be the case where the group update message 320 is received in a procedure other than the above procedure. In this case, the processings in steps 414, 415 and 416 are performed using new leader server ID 321 of that group update message 320.

(2) Group Participation Request Processing

Figure 5:
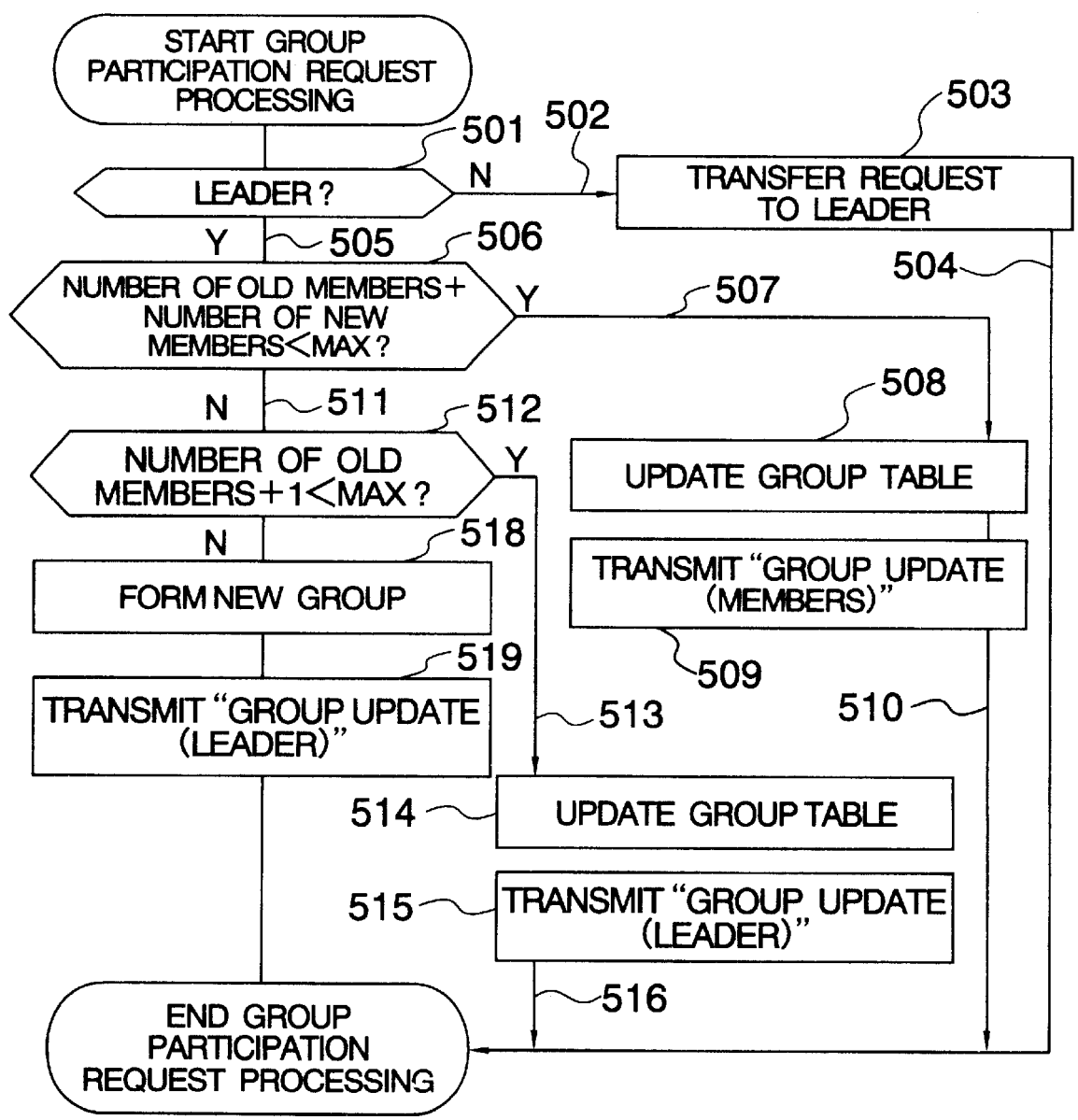
FIG. 5 is a flow chart of a group participation processing.

Next, a processing in the case where the group participation request message 300 is received will be described using FIG. 5.

When the server 10 receives a group participation message 300, the server 10 judges whether or not the server 10 itself is a leader (step 501). More particularly, the server 10 is a leader if leader server ID 231 of a group table 110 is "idle" or is stored with the server ID of the server 10 itself. If the judgement in step 501 is N (502), the group participation message 300 being now processed is transferred to a leader (or a server ID stored in leader server ID 231 of the group table 110) (step 503), thereby completing the group participation request processing (504).

On the other hand, if the judgement in step 501 is Y (505), the server 10 determines how should a group be constructed in accordance with a change in the number of members in the group. First, the number of members having presently participated in the group (or the number of server ID's 232, 232', . . . in the group table 110) is examined and is taken as the "number of old members". And, the number of servers included in the group participation message 300 (or the number of new server ID's 301, 301', . . . ) is taken as the "number of new members". In step 506, the judgement is made of whether or not the sum of the number of old members and the number of new members is smaller than MAX mentioned earlier. If this judgement is Y (507), new server ID's 301, 301', . . . included in the group participation message 300 are added to server ID's 232, 232', . . . of the group table 110 (step 508). In step 509, the server ID of the server 10 is stored into new leader server ID of a group update message 320 and this message is transmitted as a response to a group of servers corresponding to new server ID's 301, 301', . . . of the group participation message 300. Thereby, the group participation request processing is completed (510).

On the other hand, if the judgement in step 506 is N (511), the judgement is made of whether or not the addition of 1 to the number of old members is smaller than MAX (step 512). If this judgement is Y (513), new server ID 301-included in the group participation message 300 is added to server ID's 232, 232', . . . of the group table 110 (step 514). In step 515, a group update message 320 having the server ID of the server 10 stored in new leader server ID 321 is transmitted to the new server ID 301 and a group update message 320 having the new server ID 301 stored in new leader server ID 321 is transmitted to the new server ID's 301', 301", . . . . Thereby, the group participation request processing is ended (516).

On the other hand, if the judgement in step 512 is N (517), a new group is formed (step 518). Members of the new group are the sever 10, a server corresponding to new server ID 301 and a server corresponding to server ID 232. The leader of the present group is resigned to the server ID 232. More particularly, in order to turn the present group into a group having the server ID 232 as a leader, a group update message 320 stored the server ID 232 in new leader server ID 321 is transmitted to the server ID's 232, 232', . . . . Thereby, the server corresponding to the server ID 232 turns to a leader and sets an upper leader to the server 10 in accordance with the operation having already been mentioned. Next, in order to form the new group, the new server ID 301 and the server ID 232 are stored into server ID's 232, 232', . . . of a group table 110. In subsequent step 519, a group update message 320 having the server ID of the server 10 stored in new leader server ID 321 is transmitted to the new server ID 301 and a group update message 320 having the new server ID 301 stored in new leader server ID 321 is transmitted to the new server ID's 301', 301", . . . .

The above is the group participation request processing. With the foregoing operation, it becomes possible to make hierarchization corresponding to a dynamic increase in the number of servers while the maximum number of members in each group is kept equal to or smaller than MAX.

(3) Hierarchy Maintenance Message Reception Processing

Figure 6:
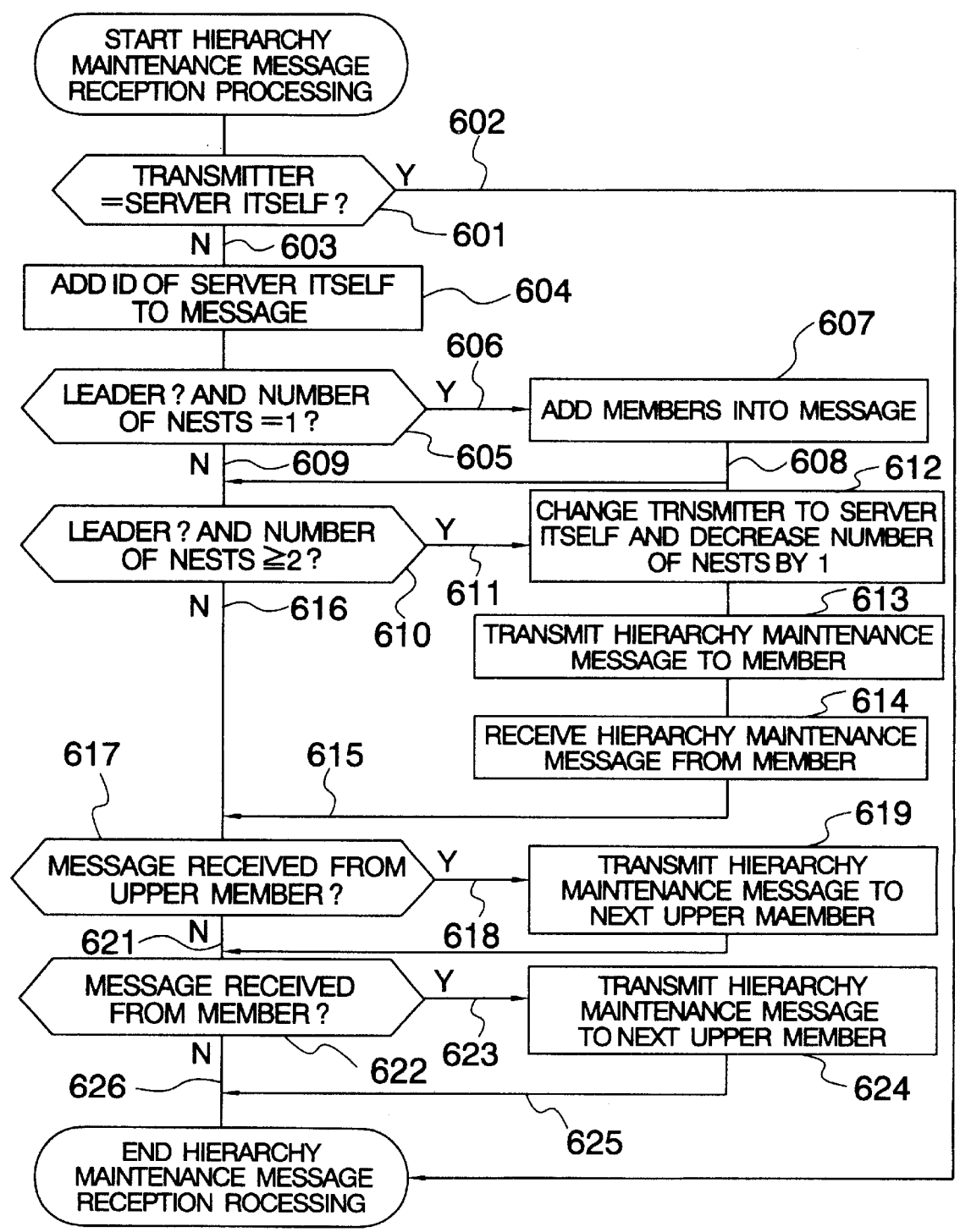
FIG. 6 is a flow chart of a hierarchy maintenance message reception processing.

In the case where the server 10 is a leader, a hierarchy maintenance message 310 is periodically issued by use of a timer or the like. The hierarchy maintenance message is circulated through the members of a group to which the server 10 belongs as well as a group hierarchy up and down to the K-th upper and lower groups in the hierarchy (K: an argument at the time of start of a hierarchy maintenance message reception processing) and then returns to the server 10 again. The procedure of a processing for realizing this operation will be described using FIG. 6. For a hierarchy maintenance message 310, each member adds data indicating that the member itself is under operation and transmits the data added message to the next member. If the communication with the next member is not possible, a try is made to the further next member. This operation results in (1) that the hierarchy maintenance message 310 returns to a leader after the circulation thereof through all members under operation, (2) that a member now holding the hierarchy maintenance message 310 encounters a trouble so that the hierarchy maintenance message 310, or (3) that the leader encounters a trouble and hence the final destination of transmission disappears. With the following protocol, it is possible to cope with any one of the results (1), (2) and (3) by using a vicarious leader and a time-out.

When the server 10 receives a hierarchy maintenance message 310, the judgement is first made of whether or not transmitter server ID 311 is equal to the ID of the server 10 itself (step 601). If the judgement is Y (602), the hierarchy maintenance message reception processing is ended.

On the other hand, if the judgement in step 601 is N (603), the server 10 adds its own server ID to new server ID 312, 312', . . . of the hierarchy maintenance message 310 (step 604).

At this time, in the case where the server ID of the server 10 itself has already been included in new server ID 312, 312', . . . , it is meant that the same hierarchy maintenance message 310 has come round twice. In this case, it is meant that the server ID itself has turned into a vicarious leader because a leader could not receive the message to be received. In this case and in the case where the hierarchy maintenance message 310 has been sent from any one of upper server ID's 234, 234', . . . in the group table 110, a group update message 320 having the server ID of the server 10 itself stored in new leader server ID 321 is transmitted to the group of servers corresponding to upper server ID's 234, 234', . . . in order that the server 10 turns into a leader of the upper group. Also, in the case where the hierarchy maintenance message 310 has been sent from any one of server ID's 232, 232', . . . in the group table 110, a group update message 320 having the server ID of the server 10 itself stored in new leader server ID 321 is transmitted to the group of servers corresponding to server ID's 232, 232', . . . in order that the server 10 turns into a group leader.

Subsequently, the judgement is made of whether or not the server 10 itself is a leader and the number of nests 313 is equal to 1 (step 605). If the judgement is Y (606), server ID's 232, 232', . . . in the group table 101 are added as new server ID's 312, 312', . . . to the hierarchy maintenance message 310 (step 606) and the flow thereafter proceeds to step 610 (608). Also, if the judgement in step 605 is N (609), nothing is done.

Subsequently, the judgement is made of whether or not the server 10 itself is a leader and the number of nests 313 is equal to or larger than 2 (step 610). If the judgement is Y (611), transmitter server ID 311 is changed to the ID of the server 10 and the number of nests 313 is decreased by 1 (step 612). In step 613, the hierarchy maintenance message 310 is transmitted to one of members. More particularly, server ID's 232, 232', . . . in the group table 110 are scanned from the top to try the transmission of the hierarchy maintenance message 310 until it results in success. If the hierarchy maintenance message 310 is returned from a member (step 614), transmitter server ID 311 of the hierarchy maintenance message 310 is returned into the original and the flow thereafter proceeds to the next processing (615).

There may be a possibility that the transmitter server ID 311 circulated between steps 613 and 614 disappears due to a trouble of a member or a trouble of the network 12. In this case, the server 10 abandons the reception in step 614 by virtue of a time-out and proceeds to the next processing (615).

Next or in step 617, the judgement is made of whether or not the hierarchy maintenance message 310 is one received from an upper member. If the judgement is Y (step 618), it is shown that this hierarchy maintenance message 310 has been circulated through upper members. Therefore, it is proper to select the destination of transmission from the upper members. More particularly, in step 619, upper server ID's 234, 234', . . . of the group table 110 are searched for an entry having the ID of the server 10 stored therein so that if there is a corresponding entry which satisfies this condition and there is a server in an entry which is next to the corresponding entry, the transmission of the hierarchy maintenance message 310 to this next entry is tried. If the transmission to the server of the next entry results in failure (or in the case where the server of the next entry has a trouble or the network 12 has a trouble), the transmission to the further next entry, the still further next entry, . . . is tried. If the try has been made up to the last entry, the try is made for an upper leader server ID 233. The above is continued until the try has been made for the upper leader server ID 233 and all the upper server ID's 234. If the transmission is possible nowhere, the transmission is abandoned. Next, the flow proceeds to step 622 (620). Also, if the judgement in step 617 is N (621), the flow proceeds to step 622.

In step 622, the judgement is made of whether or not the hierarchy maintenance message 310 is one received from a member. If the judgement is Y (step 623), it is shown that this hierarchy maintenance message 310 has been circulated through members. Therefore, it is proper to select the destination of transmission from the members. More particularly, in step 624, server ID's 232, 232', . . . of the group table 110 are searched for an entry having the ID of the server 10 stored therein so that if there is a corresponding entry which satisfies this condition and there is a server in an entry which is next to the corresponding entry, the transmission of the hierarchy maintenance message 310 to this next entry is tried. If the transmission to the server of the next entry results in failure (or in the case where the server of the next entry has a trouble or the network 12 has a trouble), the transmission to the further next entry, the still further next entry, . . . is tried. If the try has been made up to the last entry, the try is made for a leader server ID 231. The above is continued until the try has been made for the leader server ID 231 and all the server ID's 232. If the transmission is possible nowhere, the transmission is abandoned (626), thereby ending the hierarchy maintenance message reception processing. Also, if the judgement in step 622 is N (626), the hierarchy maintenance message reception processing is immediately ended.

The above is the procedure for hierarchy maintenance message processing. After the completion of the hierarchy maintenance message reception processing, the server 10 reflects the new server ID's 312 of the hierarchy maintenance message 310 into the server status table 109. Namely, a new server status table entry 220 is added for each of the ID's of servers having not corresponding server status entries 220 in the server status table 109. Also, the ID of that server is stored into server ID 221 and "infinity" is stored into latency 223. Thereby, some server groups proximate to the first server are added into the server status table 109.

One of hierarchy maintenance messages 310 having the number of nests 312 equal to 0 is used for examining the active conditions of servers in a group to propagate them to the members. In this case, a hierarchy maintenance message 310 is transmitted from a leader and returns to the leader after the circulation thereof through members under operation. Thereafter, the same message with "−1" stored in the number of nests 313 is circulated through the members. A server receiving the hierarchy maintenance message 310 having the number of nests 313 equal to −1 stores new server ID's 312, 312', . . . of the hierarchy maintenance message 310 into server ID's 232, 232', . . . and delivers the same message to the next member. With this procedure, the active conditions of the members are propagated to the whole of the group.

(4) Hierarchy Reconstruction Processing

Figure 7:
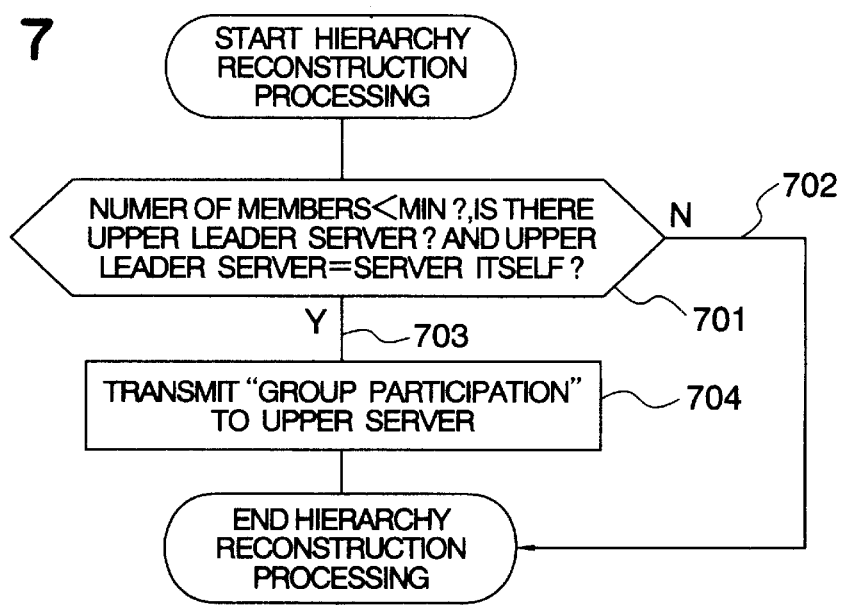
FIG. 7 is a flow chart of a hierarchy reconstruction processing.

In the case where the number of servers in a certain group becomes smaller than a fixed number, the group is reconstructed. This procedure will be described using FIG. 7.

In the case where the server 10 is a leader, a hierarchy reconstruction processing is started each time the group table 110 changes. In step 701, the judgement is made of whether or not the number of server ID's 232, 232', . . . in the group table 110 is smaller than MIN (MIN: a fixed number), upper leader server ID 233 is not "empty" and upper leader server ID 233 is other than the server ID of the server 10 itself. If this judgement is N (702), the hierarchy reconstruction processing is completed.

On the other hand, in the case where the judgement in step 701 is Y (703), a group participation message is sent to a server corresponding to the upper leader server ID 233. New server ID's 301, 301', . . . in this case are stored with the server ID of the server 10 itself and the server ID's 232, 232', . . . of the group table 110.

Thereby, a group participation request processing having already been described is started by an upper group to reconstruct a group to which the server 10 belongs. Usually, the group is reconstructed so that it is absorbed by another group.

The server status propagation protocol realized by the above-mentioned processings (1) to (4) provides the following characteristics. By structuring a multi-cast hierarchy dynamically by virtue of mutual support, a change in the operating conditions of other servers and a change in communication speed are grasped without needing a central server. By limiting, server information to be propagated, to information of proximate servers and remote servers not larger in number than a fixed number and making the number of destinations of propagation not larger than a fixed number in accordance with the structure of a multi-cast hierarchy, communication for management does not explode even if the number of servers becomes large. With the restructuring of a multi-cast hierarchy, there copes with the participation/secession of a dynamic server under system operation and there copes with the time of trouble of a part of servers or a network. By limiting, the setting given by an administrator, to only a small number of servers to be first subjected to communication at the time of server start, the setting by the administrator is simplified.

WIDE-AREA COOPERATIVE CACHE MANAGEMENT

The distributed information system managing method according to the present invention is provided with a "wide-area cooperative cache management protocol". This protocol performs the propagation of a cache directory using the multi-cast hierarchy formed by the above-mentioned server status propagation protocol and a cache control (which URL does which server hold in a cache, and when is which URL to be transferred from a certain server to another server) without needing a centrally managing server.

(1) Search of Cache and Propagation of Cache Directory

When the server 10 receives a request for information of a first URL issued by the client 11, the client request processing section 100 processes this request. The client request processing section 100 searches the cache table 107 by use of the first URL. If there is a cache table entry 200 having URL 201 equal to the first URL, the client request processing section 100 returns cache content 205 to the client 11 and increases the number of times of reference 204 by 1. If there is not such an entry, the control is transferred to the cache management section 101.

In the cache management section 101, the cache directory 108 is searched by use of the first URL to examine whether or not the information of the first URL is held by the other server 10', 10", . . . . Namely, there is a cache directory entry

210 having URL 211 equal to the first URL, the request from the client 11 is transferred to a server corresponding to server ID 212 of this cache directory entry 210. If there is not such an entry, the request from the client 11 is transmitted to the external server 13, 13', 13", . . . which is capable of processing the first URL.

A response to the request transmitted to the other server 10', 10", . . . or the external server 13, 13', 13", . . . is returned in accordance with HTTP protocol. Though the description of the details of this protocol will be omitted, it is general that the contents, size and latest updating date of information are added. When receiving this response, the cache management section 101 generates a new cache table entry 200 in the cache table 107 so that the first URL, size, latest updating date, 0 and contents of information are stored into the URL 201, size 202, date 203, number of times of reference 204 and cache contents 205 of the generated entry, respectively.

In order to update the cache directory 108 of the group, the server 10 acquiring the new information transmits a host URL message 370 to members of the group. Server ID 372, URL 373 and flag 374 of the host URL message 370 hold the ID of the server 10, the URL of the new information and "not exist", respectively.

(2) Cache Value Circulation Processing

In the present invention, the servers 10, 10', 10", . . . evaluate the cache value of cached information on the basis of an equation "cache value=(number of times of reference)×(predicted reacquisition time)/(size of information)". The predicted reacquisition time predicts a time in which the acquisition from the external server 13, 13', 13", . . . or the other server 10', 10", . . . is attained. For prediction of the predicted reacquisition time for the other server 10', 10", . . ., throughput 222 and latency 223 of the server status table 109 are used. For the predicted reacquisition time using the external server 13, 13', 13", . . ., fixed equal numbers are used for both the throughput and the latency, respectively.

The server 10, 10', 10" calculates the cache value of each information held in a cache to make the sequencing of information. In accordance with this sequence, the information is revoked or moved to the other server 10', 10", . . ., as required.

In the case where the server 10 moves first information to one of the other servers 10', 10", . . ., it is necessary to determine a server which is the destination of movement. For this purpose, the server 10, 10', 10", . . . circulates the minimum value for its own acceptable cache value (hereinafter referred to as acceptable cache value) through the other servers. As the acceptable cache value is used, for example, a cache value of that information among cached information which has the M-th cache value (M: a proper fixed number) counted from the lowest. Each server uses this acceptable cache value to select a server which is the destination of movement.

Figure 8:
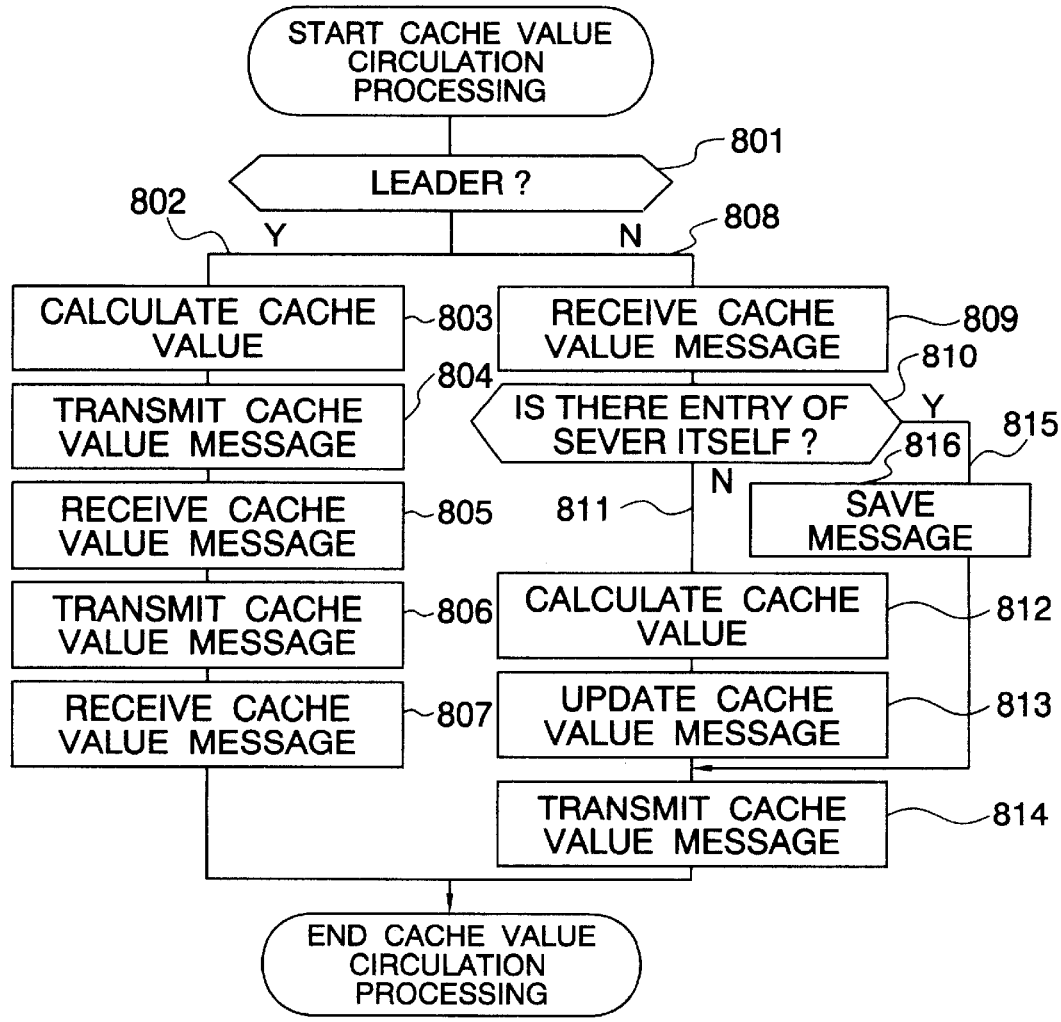
FIG. 8 is a flow chart of a cache advance notice circulation processing.

The procedure of a processing for circulation of the acceptable cache value will now be described using FIG. 8.

A cache value evaluation part 104 of a leader starts a cache value circulation processing every fixed time. Also, a cache value evaluation part 104 of the other than the leader performs a cache value circulation processing at a point of time when a cache value message 340 is received. When the cache value circulation processing is started, a server makes the judgement of whether or not the server itself is a leader (step 801).

In the case where the judgement in step 801 is Y (802), the server calculates its own acceptable cache value for circulation (step 803) in accordance with the above-mentioned outline. Next, the server generates a new cache value message 340 to generate a new cache value message entry 341 so that the server ID of the server itself and the calculated acceptable cache value are stored into the server ID 342 and cache value 343 of the generated entry, respectively. In step 804, the generated cache value message 340 is transmitted. The destination of transmission is determined by use of the group table 110 in a manner similar to that in the case of circulation of the hierarchy maintenance message.

In subsequent step 805, the cache value message 340 having been circulated through members under operation is received. In order to circulate the received message once more, the received cache value message 340 is transmitted to the members again (step 806). Further, in step 807, the cache value message 340 is received. As a result, the member under operation receives the cache value message 304 twice during the cache value circulation processing.

On the other hand, in the case where the judgement in step 801 is N (808), the server first receives a cache value message 340 (step 809) and judges whether or not there is its own cache value message entry 341 in the cache value message 340 (step 810). More particularly, the judgement is made of whether or not there is one of cache value message entries 341 in the received cache value message 340 having server ID 342 which is equal to the server ID of the server itself. In the case where this judgement is N (811), the server calculates an acceptable cache value to be circulated (step 812) and adds a cache value message entry 341 for the server itself into the cache value message 340 (step 813). Namely, the server generates a new cache value message entry 341 so that the server ID of the server itself and the calculated acceptable cache value are stored into the server ID 342 and cache value 343 of the generated entry, respectively. In step 814, the cache value message 340 is transmitted to the next member. The destination of transmission is determined by use of the group table 110 in a manner similar to that in the case of circulation of the hierarchy maintenance message.

In the case where the judgement in step 810 is Y (815), that is, in the case of the second circulation, the received cache value message 340 is saved into the cache value evaluation part 104 (step 816). Subsequently, the processing in step 814 is performed, thereby ending the cache value circulation processing.

(3) Avoidance of Cache Movement Centralization by Movement Advance Notice Circulation In the case where a plurality of servers in one group are simultaneously intending to move information, there may be a possibility that the destination of movement is centralized onto one server. In order to solve this problem, each server circulates a list of information to be moved and intended destinations of movement (referred to as movement slate) with the list carried on a movement advance notice message 350. Thereby, each server can determine a server for destination of movement while avoiding the destination of movement which is not selected by another server.

A procedure for a movement advance notice circulation processing will be described using FIG. 9.

A cache movement/revocation part 105 of a leader starts a movement advance notice circulation processing every fixed time. Also, a cache movement/revocation part 105 of the other than the leader performs a movement advance notice circulation processing at a point of time when a movement advance notice message 350 is received. When the movement advance notice circulation processing is started, a server makes the judgement of whether or not the server itself is a leader (step 901).

In the case where the judgement in step 901 is Y (902), the server generates a movement advance notice list (step 903) in accordance with the above-mentioned outline. The movement advance notice list is stored into a movement advance notice message 350 (step 904). Namely, the server generates a new movement advance notice message 350 and generates a new movement advance notice message entry 351 for each information to be moved, so that the server ID of the server itself, the URL of information to be moved and the movement destination server are stored into the server ID 352, URL 353 and movement destination server ID 354 of the generated entry, respectively. In step 905, the generated movement advance notice message 350 is transmitted. The destination of transmission is determined by use of the group table 110 in a manner similar to that in the case of circulation of the hierarchy maintenance message. In subsequent step 906, a movement processing is performed. Namely, for each information to be moved, the information is transferred through the network 12 to a server to which the information is to be moved.

On the other hand, in the case where the judgement in step 901 is N (907), the server under consideration first receives a movement advance notice message 350 (step 908) and updates its own movement advance notice list on the basis of the movement advance notice message 350 (step 909). Namely, if the movement destination server for which the movement is destined by the intention of the server under consideration is stored in the movement destination server ID 354 in the above-mentioned M or more movement advance notice message entries 351 of the movement advance notice message 350, another movement destination server is selected. Next or in step 910, the updated movement advance notice list of the server under consideration itself is reflected into the movement advance notice message 350. Namely, the server generates a new movement advance notice message entry 351 for each information to be moved, so that the server ID of the server itself, the URL of information to be moved and the movement destination server are stored into the server ID 352, URL 353 and movement destination server ID 354 of the generated entry, respectively. In subsequent step 911, the generated movement advance notice message 350 is transmitted. The destination of transmission is determined by use of the group table 110 in a manner similar to that in the case of circulation of the hierarchy maintenance message. In subsequent step 906, a movement processing is performed. Namely, for each information to be moved,.the information is transferred through the network 12 to a server to which the information is to be moved.

(4) Avoidance of Simultaneous Cache Revocation by Revocation Advance Notice Circulation In the case where a plurality of proximate servers hold a cache of the same information, it is necessary to manage so that all the copies of this cache are not revoked simultaneously. Ideally, it is preferable that only one copy of information exists for the plurality of proximate servers. In the system of the present invention, the approach to this state is made by an approximate method without using a centrally managing server. For this purpose, a list of information to be revoked (referred to as revocation slate list) is circulated through members. A member of a group gives up an intended revocation in the case where the cache of information the revocation of which is intended by the member itself is the last copy held by members of the group.

A procedure for a revocation advance notice circulation processing will be described using FIG. 10.

A cache movement/revocation part 105 of a leader starts a revocation advance notice circulation processing every fixed time. Also, a cache movement/revocation part 105 of the other than the leader performs a revocation advance notice circulation processing at a point of time when a revocation advance notice message 360 is received. When the revocation advance notice circulation processing is started, a server makes the judgement of whether or not the server itself is a leader (step 1001).

In the case where the judgement in step 1001 is Y (1002), the server generates a revocation advance notice list (step 1003) in accordance with the above-mentioned outline. The revocation advance notice list is stored into a revocation advance notice message 360 and is transmitted (step 1004). Namely, the server generates a new revocation advance notice message 360 and generates a new revocation advance notice message entry 361 for each information to be revoked, so that the server ID of the server itself and the URL of information to be revoked are stored into the server ID 362 and URL 363 of the generated entry, respectively. The destination of transmission is determined by use of the group table 110 in a manner similar to that in the case of circulation of the hierarchy maintenance message. In subsequent step 1005, a revocation advance notice message 360 is received. Thereafter or in step 1006, a revocation processing is performed. Namely, each information to be revoked is deleted from the cache table 107. At this time, the server 10 transmits a host URL message 370 to the members of the group in order to update the cache directory 108 of the group. Server ID 372, URL 373 and flag 373 of the host URL message 370 hold the ID of the server 10, URL 333 and "not exist", respectively.

On the other hand, in the case where the judgement in step 1001 is N (1007), the server under consideration first receives a revocation advance notice message 360 (step 1008) and updates its own revocation advance notice list on the basis of the revocation advance notice message 360 and the cache directory 108 (step 1009). Namely, for each information the revocation of which is intended by the server itself, if "(the number of times of appearance on cache directory 108)−(the number of times of appearance in revocation advance notice message 360)" is equal to or smaller than 1, that information is determined as being not revoked and is deleted from the revocation advance notice list. Next or in step 1010, the updated revocation advance notice list of the server itself is reflected into the revocation announcement message 360. Namely, the server generates a new revocation advance notice message entry 361 for each information to be revoked, so that the server ID of the server itself and the URL of information to be revoked are stored into the server ID 362 and URL 363 of the generated entry, respectively. In subsequent step 1011, the generated revocation advance notice message 360 is transmitted. The destination of transmission is determined by use of the group table 110 in a manner similar to that in the case of circulation of the hierarchy maintenance message. In subsequent step 1006, a revocation processing having already been described is performed.

ANTICIPATORY VALIDATION

In WWW, a time consumed for the validation of a cache occupies a considerable part of the response time for users. Thus, anticipatory validation for keeping the freshness of the cache always at a level not lower than a fixed value is introduced by periodically performing the validation of cached information. The anticipatory validation can be performed by the server 10, 10', 10", . . . even when a request from a user is not specifically made. Thereby, the validation at a point of time of reference by the user to a WWW page is avoided as much as possible.

In order to estimate what extent can the validation intervals be elongated up to, a time until the reference to a WWW page once subjected to reference is made by another user has been obtained from the record of utilization of WWW by our organization. The rate of pages referred to again within one hour is only 2.3% of the whole of WWW pages referred to. The rate is 9.9% even within 12 hours. It has also been clarified that the average interval until the reference is made again is 177.7 hours. Though it is anticipated that an accurate time depends upon the population of users, it can basically be said that even if the validation intervals are about 8 to 12 hours, little influence is given to the freshness of a cache obtained by a user. Also, in the case where a validation operation is to be changed, the conformity to HTTP/1.0 widely used or HTTP/1.1 proposed for standardization by Internet Engineering Task Force (IETF) is preferable. In HTTP/1.1, it is prescribed that if the oldness of a cache is within 24 hours, there is no need to issue a warning to a user. Therefore, preferable anticipatory validation intervals are in a range between 8 hours and 24 hours. Also, in accordance with the circumstances of an organization in which-a server is placed, a time zone specifically designated by an administrator may be used for the anticipatory validation. Thereby, it becomes possible to perform anticipatory prefetch while selecting a time zone in which employees of an enterprise do not utilize the server 10.

Further, since a considerable load is imposed on a server which performs the anticipatory validation and a network which is in the vicinity of that server, other conditions available for the anticipatory validation are a time zone in which a load from a client to the server is low (the load on the server can be obtained by an inquiry to an operating system) and a time zone in which a load on the network is low (a rough estimate of the load on the network can be obtained by recording a change in the speed of communication with servers in a group).

Each server can perform the anticipatory validation for the external servers 13, 13', 13", . . . However, with a construction in which URL's made the objects of anticipatory validation to be performed by a plurality of servers are collected onto one server for simultaneous validation, the waste of performing the validation of one URL many times is reduced. Thus, a validation request message 330 making a request from a certain server to another server for anticipatory validation is used.

A processing for anticipatory validation will be described using FIG. 11.

A validation management section 103 of a leader starts a validation processing every fixed time on the basis of the above consideration of time intervals. Similarly, a validation management section 103 of the other than the leader performs validation processing every fixed time. When the validation processing is started, a server makes the judgement of whether or not the server itself is a leader (step 1101).

In the case where the judgement in step 1101 is Y (1102), validation requests sent from members are received (step 1103). After the acceptance of the validation requests for a fixed time, the flow proceeds to step 1104 in which a validation processing is performed. The contents of this processing are such that for the URL 333 of each validation request message entry 331 in a validation request message 330, the latest updating date is acquired from the external servers 13, 13', 13", . . . by use of "HEAD" request of HTTP. Subsequently to the completion of the validation processing, the result of validation is returned to each validation requesting server (step 1105). The result of validation is the same validation request message 330 as the validation request but it is transmitted after the replacement of the date 334 of each validation request message entry 331 by the newest latest updating date obtained in step 1104.

On the other hand, in the case where the result in step 1101 is N (1107), the server first generates a validation request message 330 (step 1108). The validation request message 330 is generated in such a manner that the server generates a validation request message entry 331 for each information made the object of validation (namely, that each information of information included in the cache table 107 for which the number of times of reference 204 is equal to or larger than T (T: a fixed number)) so that the server ID of the server itself and the URL of that information are stored into server ID 332 and URL 333, respectively. Date 334 is stored with "idle". In subsequent step 1108, the generated validation request message 330 is transmitted to the leader. In subsequent step 1109, the result of validation as a response from the leader is waited and received. In step 1109, the cache table 107 is updated on the basis of the result of validation. Namely, for each validation request message entry 331 stored in a validation request message 330 which is the result of validation, a search is made for a cache table entry 200 having URL 201 of the cache table 107 which is equal to URL 333. If there is such a cache table entry 200, "0" is stored into the number of times of reference 204. And, the date 203 of the cache table entry 200 is compared with the date 334 of the validation request message entry 331. If the date 334 is later, the corresponding cache table entry 200 is deleted since information in the cache table 107 is old. At this time, the server 10 transmits a host URL message 370 to the members of the group in order to update the cache directory 108 of the group. Server ID 372, URL 373 and flag 373 of the host URL message 370 hold the ID of the server 10, URL 333 and "not exist", respectively.

For the setting of the fixed number T, it is important to consider that the locality of WWW is low. For example, in our organization, it has been found out that only once reference is made to about 70% of WWW information requested by users. Therefore, for example, if T is set to 1, it is possible to effectively limit that information of cached information which is to be subjected to validation. Namely, it is not necessary to validate a large amount of information wholly.

The anticipatory validation is performed in the above procedure, thereby ensuring the freshness of information in the cache table 107 at a certain level or a level higher than that always.

With the provision of the server status propagation protocol for distributed managing of serve operation information (or a list of servers under operation), a time/labor taken by an administrator can be reduced when a plurality of servers are cooperated with each other as in the WWW proxy. The administrator has not the need of management for cooperation between servers excepting the designation of other some servers for startup thereof.

With the provision of the wide-area cooperative cache management protocol with which the propagation of a cache directory and a cache control are performed with no centrally managing server but by use of a multi-cast hierarchy formed by the server status propagation protocol, the exchange of cache lists between a plurality of servers for operating caches distributed to the plurality of servers is effectively made, thereby making it possible for one server to inquire of another server about information absent in the one server.

With the provision of the "anticipatory validation" with which a validation operation is performed beforehand prior to a request from a user, it is possible to prevent the deterioration of the response time for users due to the validation operation.

What is claimed is:

1. A distributed server managing method in which one or more computers with server function interconnected by a network are provided, said computers have their unique numbers (ID's) and can operate or stop independently, and the destination of communication between the computers is designated by use of said ID so that computers under operation are managed in a manner classified into one or more first groups, the method comprising:

a process with which each of computers belonging to the first groups is informed of the ID's of computers forming a group to which that computer belongs;

a process with which when an administrator newly starts a first computer by giving one or more initial ID's of computers under operation, said first computer is added into any one of the first groups; and a process with which in the case where the number of computers in any one of the first groups exceeds a first fixed number, the first groups are reclassified into groups each having computers the number of which is not larger than said first fixed number.

2. A distributed server managing method according to claim 1, wherein each of the first groups has a leader and said adding process includes:

a processing with which a table of computers under operation held by one or more computers corresponding to said initial ID's are transmitted from the one or more computers to said first computer;

a processing with which said first computer selects a second computer in said table;

a processing with which said first computer transmits a request for addition of said first computer into the group through said second computer to a third computer, said third computer being a leader of a group to which said second computer belongs; and a processing with which said third computer adds said first computer into said group.

3. A distributed server managing method according to claim 1, wherein the computers under operation determine a relationship in upper/lower level between the first groups so that the first groups form a hierarchy structure.

4. A distributed server managing method according to claim 1, wherein said reclassifying process includes a processing with which a leader of said group with computers exceeding in number said first fixed number forms a new group, and a processing with which a part of computers belonging to the exceeding group are transferred to said new group.

5. A distributed server managing method according to claim 3, wherein said reclassifying process includes a processing with which a leader of said group with computers exceeding in number said first fixed number transfers, a part of computers forming a group to which said leader belongs, to an adjacent group in said hierarchy structure.

6. A distributed server managing method according to claim 2, wherein said processing for transmitting the request for addition of said first computer into the group includes:

a processing for measuring a speed of communication with a part or all of said computers under operation; and a processing for transmitting the request for addition to a group to which a computer having a high speed of communication with said first computer belongs.

7. A distributed server managing method in which one or more computers with server function interconnected by a network are provided, said computers have their unique numbers (ID's) and can operate or stop independently, and the destination of communication between the computers is designated by use of said ID so that computers under operation are managed in a manner classified into one or more first groups, the method comprising:

a process with which each of computers belonging to the first groups is informed of the ID's of computers forming a group to which that computer belongs;

a process with which when an administrator newly starts a first computer by giving one or more initial ID's of computers under operation, said first computer is added into any one of the first groups;

a process with which in the case where the number of computers in any one of the first groups exceeds a first fixed number, the first groups are reclassified into groups each having computers the number of which is not larger than said first fixed number;

a process with which in the case where any one of the computers under operation stops or has a trouble or becomes incapable of communication, that computer is deleted from a group to which that computer belongs; and a process with which in the case where the number of computers in any one of the first groups becomes smaller than a second fixed number, a part or all of computers belonging to the first groups are transferred to a second group.

8. A distributed server managing method according to claim 7, wherein an adjacent group in the hierarchy structure described in claim 3 is used as said second group.

9. A distributed server managing method according to claim 1, wherein a computer belonging to the first groups performs a processing for collecting the ID's of computers forming the first groups.

10. A distributed server managing method according to claim 1, wherein each of computers belonging to the first groups has a table for holding the ID's of all computers forming a group to which that computer belongs.

11. A distributed server managing method according to claim 1, wherein in the case where a computer belonging to a third group which is one of the first groups transmits one data to a part or all of computers forming the third group, said computer circulates said data successively through the computers forming the third group.

12. A distributed server managing method according to claim 1, wherein in the case where a computer belonging to said third group collects data from one or more computers forming said third group, said computer circulates one message through said one or more computers and each of said one or more computers adds data into said message at the time of circulation.

13. A distributed server managing method in which there are provided a client which utilizes information and two or more servers each of which holds one or more information and provides information designated by said client, said client and said servers being interconnected by a network, and information held by one server is moved to another server, the method comprising:

a process with which a movement advance notice message giving an advance notice of the movement of first information held by a first server to a second server is transmitted to one or more third servers so that the advance notice is given to said third servers; and a process with which when receiving said message, said third server stops an operation of moving second information held by said third server to said second server.

14. A distributed server managing method according to claim 13, wherein said third server is a computer which belongs to the group described in claim 1 or claim 7.

15. A distributed server managing method according to claim 13, wherein said movement advance notice message is transmitted to said third server through the successive circulation described in claim 11.

16. A distributed server managing method according to claim 13, wherein when receiving said movement advance notice message, said third server stops the operation of moving said second information to said second server in the case where the number of times of movement of information to said second server is not smaller than a first fixed number.

17. A distributed server managing method in which there are provided a client which utilizes information and two or more servers each of which holds one or more information and provides information designated by a request from said client, said client and said servers being interconnected by a network, and data held by the server can be revoked, the method comprising:

a process with which when a first server revokes first information held by said first server, a revocation advance notice message giving an advance notice of the revocation is transmitted from said first server to one or more second servers having a possibility of possessing the copy of said first information; and a process with which when receiving said revocation advance notice message, said second server stops the revocation of the copy of said first information held by said second server.

18. A distributed server managing method according to claim 17, wherein said second server is a computer which belongs to the group described in claim 1 or claim 7.

19. A distributed server managing method according to claim 17, wherein said revocation advance notice message is transmitted to said second server through the successive circulation described in claim 11.

20. A distributed server managing method according to claim 17, wherein when said second server revokes second information, said second server recirculates the circulated revocation advance notice message with an advance notice of the revocation added thereinto.

21. A distributed server managing method according to claim 17, wherein said second server holds the number of holds as the estimation of the number of those servers of said first and second servers which have a possibility of possessing said first information or the copy thereof, obtains the number of advance notices of the revocation of said first information described in said revocation advance notice message or the copy thereof, and stops the revocation of said first information held by said second server or the copy thereof if a number resulting from the subtraction of said number of revocation advance notices from said number of holds is not larger than 1.

22. A distributed server managing method in which there are provided a client which utilizes information, a server which holds the copy of one or more information and provides information designated by a request from said client, and two or more external servers each of which provides information to said server or said client, said client, said server and said external servers being interconnected by a network, and the external server responds to validation in which said server or said client inquires of whether or not the copy of information is the latest one, wherein that one of information held by said server to which the reference is made one or more times since the preceding validation is subjected by said server to validation for said external server every predetermined time.

23. A distributed server managing method according to claim 22, wherein a time between 8 hours and 24 hours is used as said predetermined time.

24. A distributed server managing method according to claim 22, wherein instead of the validation every predetermined time, the validation is performed when a time elapsed since the acquisition of said information from the external server falls within a time zone between 8 hours and 24 hours and a load on said server or a load on the network in the vicinity of said server is not larger than a predetermined value.

25. A distributed server managing method according to claim 22, wherein instead of the validation every predetermined time, the validation is performed after the lapse of 8 hours since the acquisition of said information from the external server and before the lapse of 24 hours and in a time zone designated by an administrator.

26. A recording medium in which a computer program for carrying out the distributed server managing method described in claim 1 is recorded.

27. A distributed information processing system provided with a plurality of server computers and at least one client computer which are interconnected by a network, each of said server computers including a server management section for designating a server computer as the designation of communication by use of a unique ID number applied beforehand, classifying designated server computers into one or more groups, adding a newly started server computer into any one of the groups, and reclassifying, server computers in a group the number of server computers of which exceeds a fixed number, into groups each having server computers the number of which is not larger than said fixed number.

28. A distributed server managing method according to claim 7, wherein a computer belonging to the first groups performs a processing for collecting the ID's of computers forming the first groups.

29. A distributed server managing method according to claim 7, wherein each of computers belonging to the first groups has a table for holding the ID's of all computers forming a group to which that computer belongs.

30. A distributed server managing method according to claim 7, wherein in the case where a computer belonging to a third group which is one of the first groups transmits one data to a part or all of computers forming said third group, said computer circulates said data successively through the computers forming said third group.

31. A distributed server managing method according to claim 7, wherein in the case where a computer belonging to said third group collects data from one or more computers forming said third group, said computer circulates one message through said one or more computers and each of said one or more computers adds data into said message at the time of circulation.

32. A recording medium in which a computer program for carrying out the distributed server managing method described in claim 7 is recorded.

33. A recording medium in which a computer program for carrying out the distributed server managing method described in claim 13 is recorded.

34. A recording medium in which a computer program for carrying out the distributed server managing method described in claim 22 is recorded.

* * * * *